Oct. 17, 1944.　　　　R. B. ZUBER　　　　2,360,752
AUTOMATIC END STOP FOR A SHEAR
Filed Aug. 10, 1943　　　2 Sheets-Sheet 1

INVENTOR:
ROBERT B. ZUBER,
BY John E. Jackson
HIS ATTORNEY.

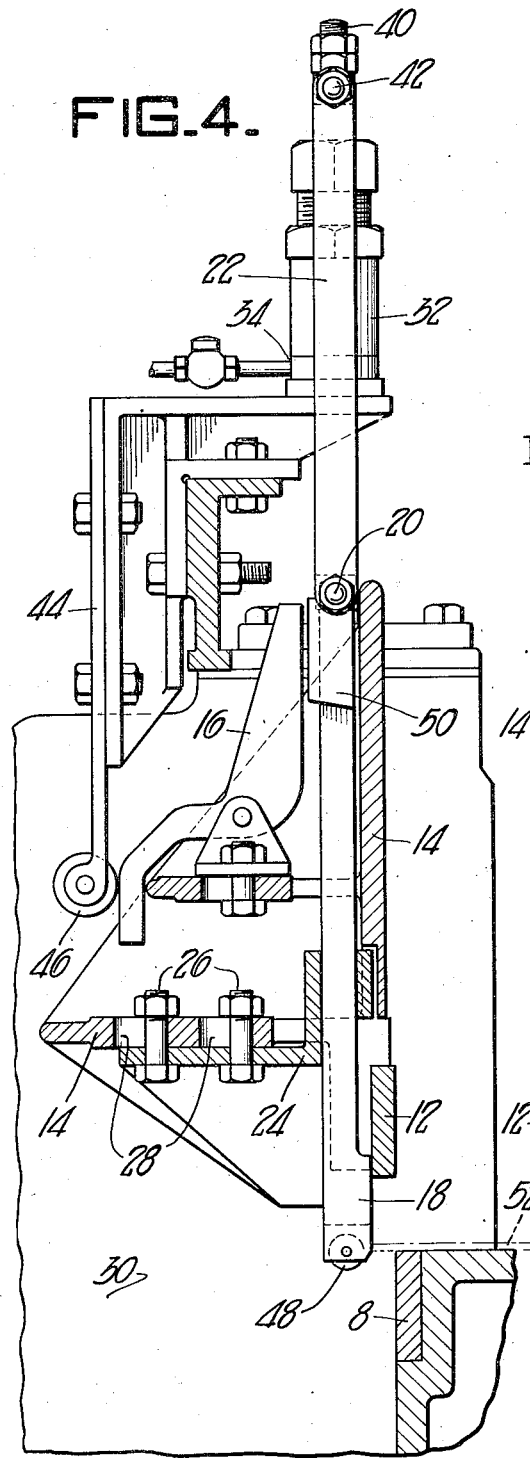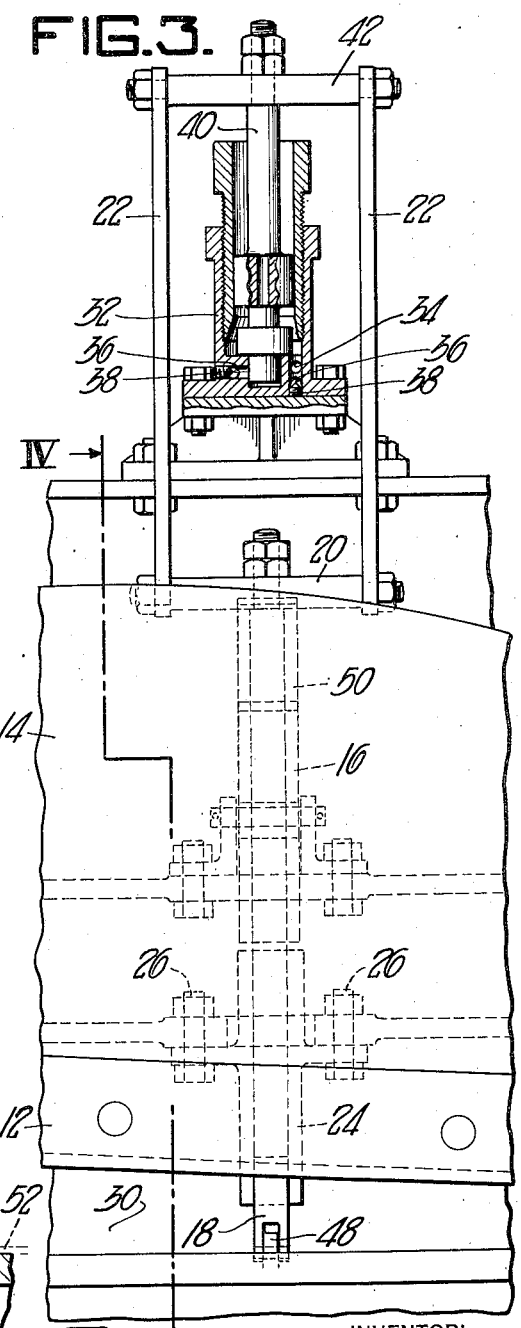

Patented Oct. 17, 1944

2,360,752

UNITED STATES PATENT OFFICE 2,360,752

AUTOMATIC END STOP FOR A SHEAR

Robert B. Zuber, Birmingham, Ala., assignor to Tennessee Coal, Iron and Railroad Company, a corporation of Tennessee Application August 10, 1943, Serial No. 498,101

8 Claims. (Cl. 164—59)

This invention relates to an automatic end stop for a shear, especially for that type of shear known as the Streine resquaring shear which consists of a rotary side trimming shear and two end shears, one end shear being fixed and the other being adjustable in accordance with the length of the sheet to be sheared. Previous to the installation of the automatic stop on the end shear, the operator caught the sheet as it was delivered from the rotary side trimmer and placed it against side squaring rolls located between the two end shears. At the same time, he estimated the amount of end scrap to be cut from each end and placed the sheet under the shears for simultaneous shearing of the two ends. Since sheets are delivered to the operator at a rapid rate he has little time to perform these operations and therefore a large part of the sheets were cut short in length due to the operator cutting all the scrap from one end. In order to facilitate production, it was necessary to have an excessive allowance for end scrap.

It is an object of this invention to provide an automatic end stop to determine the amount of scrap to be cut from the sheet.

This and other objects will be more apparent after referring to the following specification and attached drawings, in which:

Figure 3 is a front elevation, partly in cross-section, showing the automatic stop; and Figure 4 is a cross-sectional view taken on the line IV—IV of Figure 3.

Figure 2:
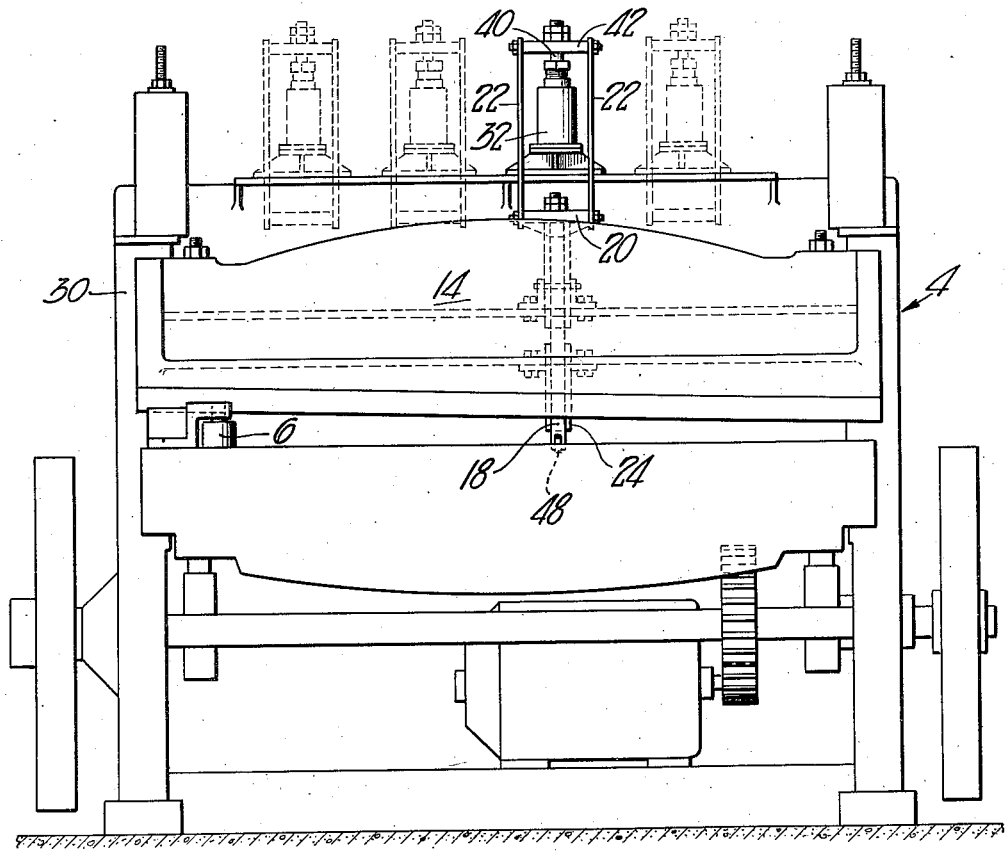
Figure 2 is an elevational view taken on the line II—II of Figure 1.

Referring more particularly to the drawings, the reference numeral 2 indicates a stationary end shear. Separated from the shear 2 by a distance equal to the length of the finished sheet is a movable end shear 4. Between the shears is a pair of side squaring rolls 6. The shear 4 has a stationary bottom knife 8, the top of which is in the same horizontal plane as the shear table 10 and a movable top knife 12 mounted on the shear head 14 which is reciprocated by means of the usual mechanism. Pivotally mounted on the shear head 14 is a dog 16. A stop 18 is pivotally carried on a bolt 20 which is supported by a yoke 22. A guide 24 for the stop 18 is adjustably mounted by means of bolts 26 which pass through slots 28 in shear head 14. By moving the guide 24 with respect to the shear knife 12, the distance of the stop 18 from the knife 12 is varied, this determining the amount of scrap to be cut from the end of the strip. Mounted on the frame of the shear 30 is a dashpot cylinder 32 having an inlet 34 and exhaust ports 36 which are adjustable by means of set screws 38. The piston rod 40 of the dashpot carries a cross head 42 which supports the yoke 22. A bracket 44, which is adjustably mounted on frame 30 carries a roller 46 which engages the lower end of dog 16 as shown in Figure 4. The stop 18 has a roller 48 at its lower end to prevent damage to the sheets when struck by the stop. A sleeve 50 surrounds the stop 18 near the top thereof and is adapted to be engaged by the top of dog 16. As shown in Figure 2, the stop and associated mechanism is adjustable across the width of the shear so that it can be used with sheets of various widths.

Figure 1:
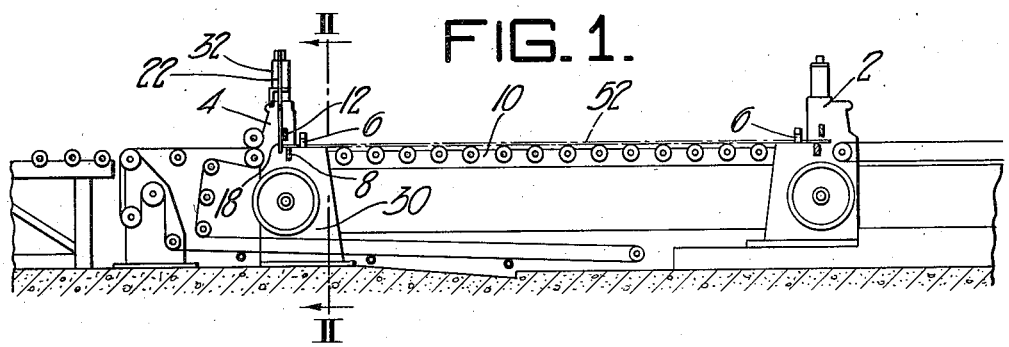
Figure 1 is a side elevation of the resquaring shear.

The operation of the device is as follows:

A sheet 52 coming from the rotary side trimmer is shoved against side squaring rolls 6 and its forward end is shoved against the stop 18 which is in its lower position as shown in Figure 1. With the sheet in this position, the operator steps on the starter button and the shears make their cuts, the stop 18 remaining in its lowered position during the shearing operation. As the shear head moves down, it carries the dog 16 out of engagement with roller 46 and when the top of the dog is below the sleeve 50, it will swing over under the sleeve 50. As the shear head 14 moves upwardly, the dog 16 engages the sleeve 50 and lifts the stop 18, allowing the sheet 52 to pass thereunder. As upward movement of the shear head continues, the roller 46 engages the end of dog 16, releasing it from engagement with the sleeve 50, permitting the stop to move downwardly to the position shown in Figure 4. The downward speed of the stop 18 is controlled by the dashpot and the rate of speed may be varied by changing the setting of set screws 38 covering the exhaust ports 36, this regulating the quantity of air which is permitted to escape from the dashpot cylinder 32. The shear is then ready to receive another sheet. The automatic stop increases production, reduces scrap, and eliminates short sheets which are sheared on one end only.

While one embodiment of the invention has been shown and described, it will be apparent that other adaptations and modifications may be made without departing from the scope of the attached claims.

I claim:

1. In a shear for squaring the end of metallic stock, the combination including a pair of shear knives, at least one of said knives being movable, a pair of side squaring rolls mounted adjacent said knives, a reciprocating stop for determining the amount of scrap to be cut from said stock mounted adjacent said movable knife, means carried by said movable knife for moving said stop away from the other of said knives to obtain clearance therebetween as the knife moves upwardly, means for maintaining this clearance long enough to permit a sheet to pass unimpeded, and means for releasing said first named means after said clearance has been formed to permit return of said stop to working position.

2. In a shear for squaring the end of metallic stock, the combination including a pair of shear knives, at least one of said knives being movable, a pair of side squaring rolls mounted adjacent said knives, a reciprocating stop for determining the amount of scrap to be cut from said stock mounted adjacent said movable knife, means carried by said movable knife for moving said stop away from the other of said knives to obtain clearance therebetween as the knife moves upwardly, means for releasing said means after said clearance has been formed to permit return of said stop to working position, and means for varying the rate of movement of said stop to working position.

3. In a shear for squaring the end of metallic stock, the combination including a pair of shear knives, at least one of said knives being movable, a pair of side squaring rolls mounted adjacent said knives, a reciprocating stop for determining the amount of scrap to be cut from said stock mounted adjacent said movable knife, a dog pivotally mounted for movement with said movable knife, said dog being adapted to engage said stop to move it away from the other of said knives to obtain clearance therebetween, and a roller adapted to trip said dog after said stop has been moved away from said last named knife to permit return of said stop to working position.

4. In a shear for squaring the end of metallic stock, the combination including a pair of shear knives, at least one of said knives being movable, a pair of side squaring rolls mounted adjacent said knives, a reciprocating stop for determining the amount of scrap to be cut from said stock mounted adjacent said movable knife, a dog pivotally mounted for movement with said movable knife, said dog being adapted to engage said stop to move it away from the other of said knives to obtain clearance therebetween, and a roller adapted to trip said dog after said stop has been moved away from said last named knife to permit return of said stop to working position, and means for controlling the rate of movement of said stop to working position.

5. In a shear for squaring the end of metallic stock, the combination including a stationary shear knife, a movable shear knife mounted above said stationary knife, a pair of side squaring rolls mounted adjacent side knives, a dog pivotally mounted for movement with said movable knife, a reciprocating stop for determining the amount of scrap to be cut from said stock mounted adjacent said movable knife, a sleeve mounted on said stop for engaging one end of said dog when said movable knife is in its lowered position, said dog lifting said stop during upward movement of said movable knife, a stationary roller adapted to engage the other end of said dog to release it from engagement with said sleeve after predetermined movement thereof to permit return of said stop to working position.

6. In a shear for squaring the end of metallic stock, the combination including a stationary shear knife, a movable shear knife mounted above said stationary knife, a pair of side squaring rolls mounted adjacent said knives, a dog pivotally mounted for movement with said movable knife, a reciprocating stop for determining the amount of scrap to be cut from said stock adjustably mounted adjacent said movable knife, a sleeve mounted on said stop for engaging one end of said dog when said movable knife is in its lowered position, said dog lifting said stop during upward movement of said movable knife, a stationary roller adapted to engage the other end of said dog to release it from engagement with said sleeve after predetermined movement thereof to permit return of said stop to working position, and a dashpot for controlling the rate of downward movement of said guide after its release.

7. In a shear for squaring the end of metallic stock, the combination including a pair of shear knives, at least one of said knives being movable, a reciprocating stop for determining the amount of scrap to be cut from said stock mounted adjacent said movable knife, means carried by said movable knife for moving said stop away from the other of said knives to obtain clearance therebetween as the knife moves upwardly, means for maintaining this clearance long enough to permit a sheet to pass unimpeded, and means for releasing said first named means after said clearance has been formed to permit return of said stop to working position.

8. In a shear for squaring the end of metallic stock, the combination including a pair of shear knives, at least one of said knives being movable, a reciprocating stop for determining the amount of scrap to be cut from said stock mounted adjacent said movable knife, a dog pivotally mounted for movement with said movable knife, said dog being adapted to engage said stop to move it away from the other of said knives to obtain clearance therebetween, and means adapted to trip said dog after said stop has been moved away from said last named knife to permit return of said stop to working position.

ROBERT B. ZUBER.